United States Patent [19]
Celada et al.

[11] 3,816,102
[45] June 11, 1974

[54] METHOD AND APPARATUS FOR REDUCING PARTICULATE METAL ORES TO SPONGE METAL AND COOLING THE REDUCED METAL

[75] Inventors: Juan Celada; Patrick W. Mackay; Enrique R. Martinez, all of Monterrey, Mexico

[73] Assignee: Fierro Esponja S.A., Monterrey, N. L., Mexico

[22] Filed: Nov. 26, 1971

[21] Appl. No.: 202,411

[52] U.S. Cl............................ 75/35, 75/41, 266/27
[51] Int. Cl....................... C21b 13/00, F27b 5/16
[58] Field of Search................................ 75/35, 41

[56] References Cited
UNITED STATES PATENTS

| | | | |
|---|---|---|---|
| 2,048,112 | 7/1936 | Gahl | 75/35 |
| 2,793,946 | 5/1957 | Paschal | 75/41 |
| 3,375,098 | 3/1968 | Marshall | 75/35 |
| 3,375,099 | 3/1968 | Marshall | 75/35 |
| 3,475,160 | 10/1969 | Heinzelmann | 75/35 |

*Primary Examiner*—L. Dewayne Rutledge
*Assistant Examiner*—Peter D. Rosenberg
*Attorney, Agent, or Firm*—Curtis, Morris & Safford

[57] ABSTRACT

A method and apparatus are disclosed for achieving improved reduction efficiency in the reduction of particulate metal ores, e.g., iron ore, in a vertical shaft, moving bed reactor having a reduction zone in which a hot reducing gas is caused to flow through a portion of the ore bed to reduce the metal ore thereof to metal, e.g., sponge iron, and a cooling zone in which a gaseous coolant is caused to flow through the reduced metal to cool it. Both the reducing gas and cooling gas are recycled to the reactor in loops that are interconnected and a split flow of reducing gas in the reduction zone is used. Make-up reducing gas is supplied to the interconnected loops and depleted reducing gas is vented therefrom. A method and apparatus for controlling gas flow in the several loops of the reduction system are also disclosed.

17 Claims, 1 Drawing Figure

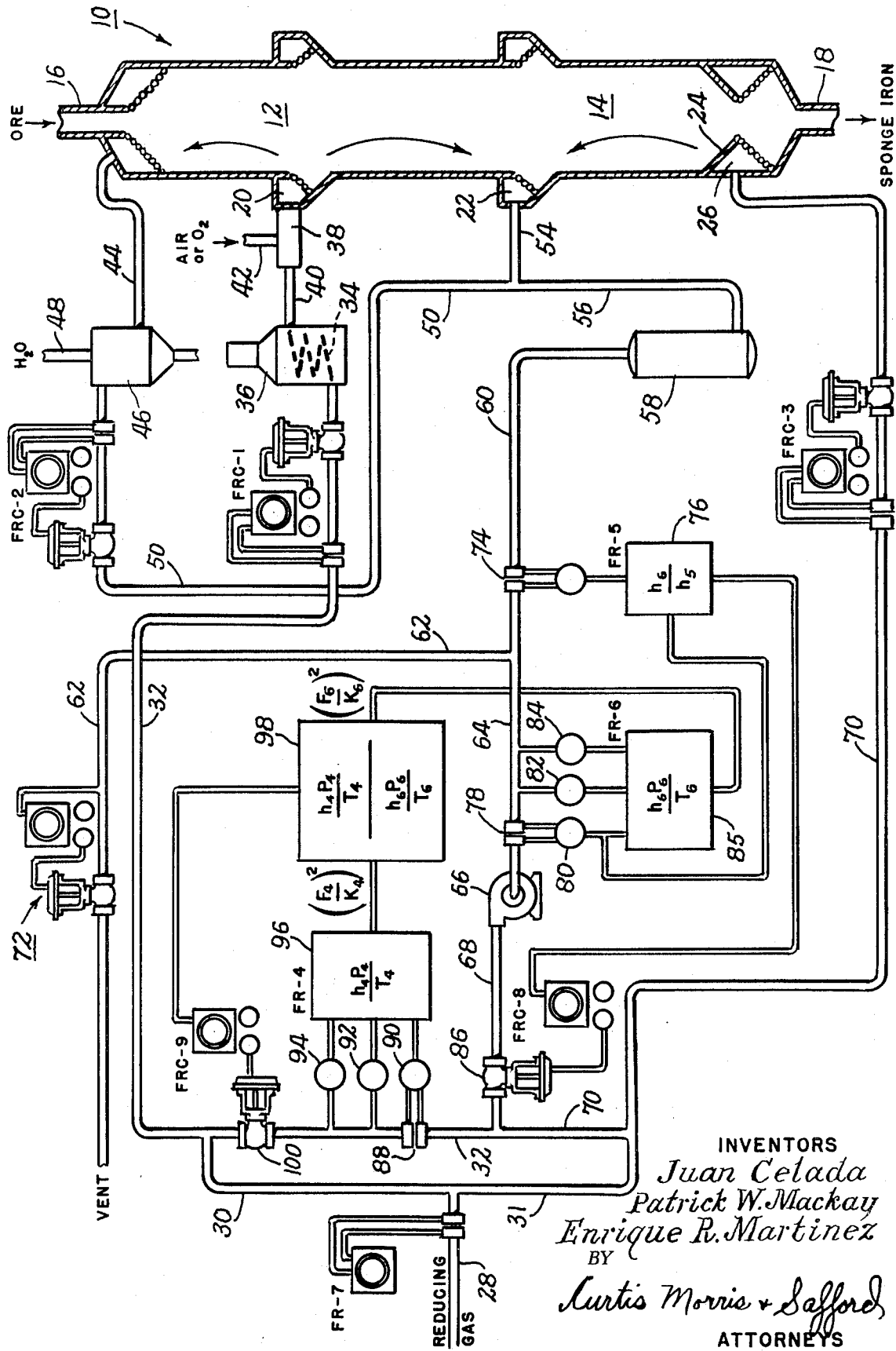

METHOD AND APPARATUS FOR REDUCING PARTICULATE METAL ORES TO SPONGE METAL AND COOLING THE REDUCED METAL

This invention relates to the gaseous reduction of particulate ores to metals in particulate form in a moving bed, vertical shaft reactor, and more particularly, to a method and apparatus for improving the efficiency of the reduction of the ore in such a reactor. In the following description the method and apparatus are illustratively described as applied to the reduction of iron ore to sponge iron. However, as the description proceeds, it will be evident to those skilled in the art that the invention is also applicable to the treatment of ores other than iron ore.

In general, the production of sponge iron in a vertical shaft, moving bed reactor ordinarily involves two principal steps, namely, reduction of the ore in a reduction zone of the reactor with a suitable hot reducing gas and subsequent cooling of the resulting sponge iron with a gaseous coolant in a cooling zone of the reactor. The reducing gas is typically a gas largely composed of carbon monoxide and hydrogen made, for example, by the catalytic reforming of a mixture of natural gas and steam or by a water gas reaction or in other known manner. The reducing gas is brought into contact with the iron ore in the reduction zone of the reactor at a temperature of the order of 850° to 1,100° C., preferably 900° to 1,000° C. The reducing gas may be introduced into the reactor at the bottom of the reduction zone and caused to flow counter-currently to the downwardly moving ore bed, or alternatively, the reducing gas may be introduced at the top of the reduction zone and caused to flow co-currently with the downwardly moving ore bed.

As conducive to a clearer understanding of the present invention, it may be pointed out that the overall reduction rate achieved in such a reactor depends primarily upon two factors, namely, (a) the chemical reaction rate between the reducing constituents of the gas and the oxygen of the ore and (b) the rate at which the reducing gas diffuses into the interior of the ore particles. The chemical reaction rate is strongly temperature-dependent, whereas the gas diffusion rate into the ore particles is essentially independent of temperature and depends importantly upon the concentration of hydrogen in the reducing gas. In the early stages of the reduction process, that is, when the extent of reduction of the ore is between, say, 0 percent and about 60 percent, the chemical reaction rate is the dominant factor in determining the overall reduction rate, whereas in the later stages of the reduction process, i.e., between, say, 60 percent and 95 percent reduction, the gas diffusion rate is the dominant factor in determining the overall reduction rate.

In cases where counter-current flow of the reducing gas and ore is used, the fresh gas containing a high proportion of hydrogen initially comes into contact with largely reduced ore. Thus the rate of diffusion of gas into the ore particles is relatively high. In other words, the conditions in the lower portion of the reduction zone tend to favor a relatively high overall reduction rate. As the gas moves upwardly into the upper portion of the reduction zone, both its temperature and content of reducing constituents decrease. As pointed out above, when the percentage of reduction is less than 60 percent, the chemical reaction rate becomes a dominant factor and this reaction rate is adversely affected by both the relatively low temperature of the gas and its low concentration of reducing constituents. Thus the conditions in the upper portion of the reduction zone are unfavorable from the standpoint of achieving a high overall reduction rate.

In cases where co-current flow of the reducing gas and ore is used, the high temperature and concentration of reducing constituents in the gas entering the upper portion of the reduction zone tend to maximize the chemical reaction rate. Thus the conditions in the upper portion of the reduction zone are favorable from the standpoint of achieving a high overall reduction rate. However, in the lower portion of the reduction zone, the gas is substantially depleted in respect to its hydrogen content and thus diffuses relatively slowly into the interior of the largely reduced sponge iron particles. Since this diffusion rate is the dominant factor in the overall reduction rate in the case of largely reduced particles, the conditions in the lower portion of the reduction zone are unfavorable from the standpoint of achieving a high overall reduction rate.

In some cases it is desirable to increase the carbon content of the reduced sponge iron. This increase in carbon content can be conveniently effected as disclosed, for example, in U.S. Pat. No. 3,136,624, by using a carbon-containing reducing gas as a coolant under such conditions that at least a portion of the coolant gas is cracked to deposit carbon on the surfaces of the sponge iron particles. By suitably controlling the composition and flow rate of the coolant gas a desired amount of carbon, for example, 1.5 to 2 percent by weight of the sponge iron, can be deposited on the sponge iron particles.

It is accordingly an object of the present invention to provide an improved method of reducing metal ores, e.g., iron ores, to sponge metal, e.g., sponge iron, and to cool the reduced metal under such conditions as to deposit a desired amount of carbon thereon. It is another object of the invention to provide such a method having improved reduction efficiency. It is still another object of the invention to provide a method and apparatus for the gaseous reduction of metal ores in a moving bed reactor which combines the advantages of counter-current and co-current flow of gas and ore in the reducing zone of the reactor while minimizing the disadvantages thereof. It is a still further object of the invention to provide a method of achieving the foregoing objects with a minimum of auxiliary apparatus such as pumps, heaters, coolers and the like. It is a still further object of the invention to provide a method and apparatus which reduces the residence time in the reactor required to achieve a given degree of reduction and thereby increases the production of the reactor. It is another object of the invention to provide an efficient and effective method of controlling the flow of the several gas streams in a system of the type described herein. Other objects of the invention will be in part obvious and in part pointed out hereafter.

The objects and advantages of the present invention may best be understood and appreciated by reference to the accompanying drawing which illustrates diagrammatically apparatus incorporating a preferred embodiment of the apparatus invention and capable of being used to carry out the method of the invention. Referring to the drawing, the ore reduction system there shown comprises, in general, a vertical shaft reactor having a downwardly moving particulate ore bed therein and interconnected reducing gas and cooling gas loops for supplying reducing gas and cooling gas to the reactor for reducing the iron ore therein and cooling the reduced metal. In the drawing the vertical shaft reactor is generally designated by the numeral 10 and has a reduction zone 12 in the upper portion thereof and a cooling zone 14 in the lower portion thereof. The reactor 10 is suitably heat insulated and is interiorly lined with a refractory material in a manner known in the art. Particulate ore to be treated is introduced into the reactor 10 through a charging pipe 16. The ore to be charged may be in the form of lumps or preformed pellets. It flows downwardly through the reduction zone 12 wherein it is largely reduced to sponge iron in a manner described below, then through cooling zone 14 wherein it is cooled by cooling gas flowing therethrough and leaves the reactor through outlet pipe 18.

Near the center of the reduction zone 12 the reactor is provided with an annular plenum chamber 20 which extends around the periphery of the reactor and provides a means whereby reducing gas may be fed to the reactor. At the bottom of reduction zone 12 there is a second plenum chamber 22, similar to the plenum chamber 20, through which reducing gas can be removed from the reactor. Near the bottom of the reactor there is a frusto-conical baffle 24 which together with the wall of the reactor defines an annular space 26 through which cooling gas may be introduced into the reactor to flow through the body of reduced particles in cooling zone 14. If desired, the reactor 10 may be operated at an elevated pressure in which event the ore is fed at the top of the reactor and the sponge iron removed from the bottom of the reactor by using suitable and known feed and discharge apparatus adapted to maintain the desired pressure in the reactor. For example, the feed and discharge apparatus may be of the type disclosed in U.S. application Ser. No. 70,027 filed Sept. 8, 1970.

As shown in the drawing, the flow of gas through the various portions of the illustrated system is regulated and controlled by a number of instruments. In order to simplify the description, the general gas flow pattern in the system will be first described and the instruments for regulating and controlling the flow in the several parts of the system will be described thereafter.

Referring to the left-hand portion of the drawing, fresh reducing gas composed largely of carbon monoxide and hydrogen enters the system through a pipe 28 from a suitable source (not shown). The reducing gas may be generated, for example, in a known type of catalytic reformer wherein a mixture of preheated natural gas and steam are caused to flow through a heated catalyst bed of the reformer. In flowing through the catalyst bed, the natural gas/steam mixture is converted to a gas mixture consisting largely of carbon monoxide, hydrogen and water vapor. The effluent gas from the reformer is passed through a quench cooler wherein it is quenched to remove most of the water vapor therefrom, after which the cooled gas may be supplied to the pipe 28.

Gas entering the system through pipe 28 is divided and a portion thereof flows through pipe 30 to a reducing gas loop of the system while the remainder of the entering gas flows through a pipe 31 to a cooling gas loop of the system. More particularly, entering reducing gas flows from pipe 30 into pipe 32 and thence to a heating coil 34 of a heater 36 wherein it is heated to a temperature of the order of 700° to 850° C.

Since the temperature of the reducing gas as it enters the reactor should desirably be of the order of 900° to 1,100° C., i.e., above the temperature of the gas leaving the coil heater 36, the gas is further heated before entering the reactor in a combustion chamber 38 to which the outlet of coil 34 is connected by a pipe 40. Within the combustion chamber 38 the reducing gas is mixed with a minor amount of air or oxygen supplied through pipe 42. A portion of the reducing gas is burned within the combustion chamber to raise the temperature of the resulting mixture to the desired value. Especially in cases where air is used as the oxidant, the oxidant gas is desirably preheated to approximately the temperature of the reducing gas with which it is mixed. Such preheating can be effected, for example, in a coil heater such as the coil heater 36. The addition of air or oxygen to the reducing gas may be effected, for example, as disclosed in U.S. Pat. No. 2,900,247.

The hot gas from combustion chamber 38 flows through plenum chamber 20 into the reducing zone 12 of the reactor near the center of the reducing zone and is then divided. More particularly, a portion of the entering gas flows upwardly through the reduction zone, i.e., counter-currently to the flow of ore in the reactor, whereas the remainder of the entering gas flows downwardly through the portion of the ore bed in the lower part of the reduction zone, i.e., co-currently to the flow of ore particles in the reactor. The upwardly flowing hot reducing gas stream effects a partial reduction of the ore in the upper portion of the reduction zone and is removed near the top of the reactor through a pipe 44 which leads to a quench cooler 46 into which water is introduced through a pipe 48 to cool and dewater the effluent gas.

The portion of the hot reducing gas entering the reactor from combustion chamber 38 and flowing downwardly through the reduction zone substantially completes the reduction of the ore in the lower portion of the reduction zone and is then combined with gas that flows upwardly through cooling zone 14 in a manner further described hereafter. The combined gas streams are withdrawn from the reactor through the plenum chamber 22 and a pipe 54. Gas from the top of the reactor leaving the cooler 46 through pipe 50 is mixed with the gas flowing through pipe 54 and the resulting mixture flows through pipe 56 to a quench cooler 58 wherein it is cooled to reduce its temperature and remove water vapor therefrom.

Since the gas mixture flowing through pipe 56 to the cooler 58 is relatively depleted in respect to reducing constituents, the effluent gas from cooler 58 is divided and a portion thereof is removed from the system. More particularly, the effluent gas from cooler 58 flows through pipe 60 to a vent pipe 62 through which a portion of the gas leaves the system with the remainder of the gas flowing through pipe 64 to the suction side of a pump 66. The gas removed from the system through vent pipe 62 may be used as a fuel gas for the heater 36 or for other purposes as desired.

The portion of the gas mixture flowing through pipe 64 to pump 66 is discharged through pipe 68 and again divided into two portions, one of which is recycled through pipe 32, heater 36, pipe 40 and combustion chamber 38 to the plenum chamber 20, and the other portion of which flows through a pipe 70 to the lower portion of the cooling zone 14 of the reactor. More particularly, the relatively cold gas flowing through pipe 70 enters the reactor through chamber 26 and flows upwardly through the reduced metal in the cooling zone 14 to cool it. As it flows through the cooling zone the cooling gas is heated and a portion thereof is cracked to deposit carbon on the surface of the sponge iron. As indicated above, the cooling gas that flows upwardly through the cooling zone 14 is combined with the downwardly flowing reducing gas stream in the lower portion of the reduction zone and the combined gas stream withdrawn through plenum chamber 22.

It is apparent from the foregoing description that in the present system the gas flows in three interconnected loops, including the upper portion of the reducing zone, the lower portion of the reducing zone and the cooling zone, respectively. Thus the first gas loop includes the upper portion of the reducing zone, pipe 44, cooler 46, pipe 50, pipe 56, cooler 58, pipe 60, pipe 64, pump 66, pipe 68, pipe 32, heater 36, pipe 40, combustion chamber 38 and plenum chamber 20. The second loop comprises the lower portion of the reduction zone, plenum chamber 22, pipe 54, pipe 56, cooler 58, pipe 60, pipe 64, pump 66, pipe 68, pipe 32, heater 36, pipe 40, combustion chamber 38 and plenum chamber 20. The third loop comprises cooling zone 14, plenum chamber 22, pipe 54, pipe 56, cooler 58, pipe 60, pipe 64, pump 66, pipe 68, pipe 70 and annular space 26. It will be noted that pipe 32, heater 36 and combustion chamber 38 are common to both the first and second loops, thereby making it necessary to use only one heating system for both streams of gas that flow through the reduction zone. Also cooler 58, pipe 60, pipe 64, pump 66 and pipe 68 are common to all three of the loops and hence the desired gas flow can be achieved with a single pump.

Turning now to the instrumentation of the system, as indicated above, fresh reducing gas enters the system through pipe 28 which is provided with an orifice-type flow recording meter FR-7 for indicating the inlet gas flow. The vent pipe 62 for removing depleted reducing gas from the system is provided with a back pressure regulator 72 having a manually adjustable set point so that it may be adjusted to maintain a desired positive and constant pressure in the system to improve the efficiency of pump 66 and also prevent air leakage into the system.

Pipe 32, near the inlet of heater 36, is provided with a recording flow controller FRC-1 having a manually adjustable set point by which it may be set for a predetermined desired flow through pipe 32. If the gas flow called for by FRC-1 is greater than the flow recycled through pipe 32, make-up gas flows through pipe 30 into pipe 32 to make up the difference.

In like manner, pipe 50 contains a controller FRC-2 having a manually adjustable set point. Adjustment of controller FRC-2 determines the relative proportions of the gas entering the reactor through plenum chamber 20 that flow upwardly and downwardly through the reduction zone.

Pipe 70 of the cooling loop is provided with a controller FRC-3 which may be manually set to produce a desired flow of cooling gas into the cooling zone 14. This adjustment depends in part on the amount of carbon deposition desired in the cooling zone. If the gas flow called for by FRC-3 is greater than the flow recycled through pipe 70, make-up gas is drawn into the cooling loop through pipe 31.

Flow through pipes 60 and 64 is automatically regulated to maintain a constant ratio between the flow downstream and upstream of vent pipe 62. Thus pipe 60 contains a flow meter generally designated FR-5 and responsive to the pressure differential ($h_5$) across orifice 74 in pipe 60. Meter FR-5 is adapted to generate a corresponding signal that is transmitted to a ratio computer 76. Pipe 64 contains another flow meter generally designated FR-6 and comprising orifice 78, a sensor 80 responsive to the differential pressure ($h_6$) across the orifice 78, a sensor 82 responsive to the pressure ($P_6$) in pipe 64 and a sensor 84 responsive to the temperature ($T_6$) of the gas in pipe 64. The sensors generate signals that are transmitted to a ratio computer 85 which generates a signal proportional to the square of the flow, i.e., ($h_6$) ($P_6$)/$T_6$ which is equal to $(F_6/K_6)^2$ where K is the orifice constant.

The signal generated by sensor 80, i.e., ($h_6$) is transmitted to ratio computer 76 which generates a signal corresponding to the ratio $h_6/h_5$. Since gas flowing through the orifices 74 and 78 has the same pressure and temperature, it is unnecessary for meter FR-5 to be provided with separate pressure and temperature sensors. Also since the composition of the gas flowing through orifices 74 and 78 is the same, the specific gravity of the gas does not affect the ratio $h_6/h_5$. The output signal of computer 76 is transmitted to the recording controller FRC-8 which converts it into a pneumatic pressure for regulating valve 86 in pipe 68 and so regulates the valve as to maintain the ratio $h_6/h_5$ constant.

As described above, at the discharge end of pipe 68 the gas flow is divided with a portion of the gas flowing through pipe 32 to heater 36 and a second portion of the gas flowing through pipe 70 to the chamber 26 at the bottom of the cooling section of the reactor. The portion of this divided flow of gas passing through the portion of pipe 32 between pipes 68 and 30 is regulated in such a manner as to maintain this gas flow at a substantially constant fraction of the gas flow through pipe 68. To accomplish this objective, a flow meter generally designated FR-4 and similar to meter FR-6 is provided. The meter FR-4 comprises an orifice 88, a sensor 90 responsive to the differential pressure ($h_4$) across orifice 88, a sensor 92 responsive to the pressure ($P_4$) in pipe 32 and a sensor 94 responsive to the temperature ($T_4$) of the gas in pipe 32. The sensors 90, 92 and 94 generate signals that are transmitted to a ratio computer 96 of the flow meter FR-4. The ratio computer 96 generates a signal proportional to the square of the flow in pipe 32, i.e., ($h_4$)($P_4$)/$T_4$ which is equal to $(F_4/K_4)^2$ where K is the orifice constant. This signal is transmitted to a ratio computer 98.

As described above, ratio computer 85 of flow meter FR-6 generates a signal equal to the square of the flow through pipe 64 $(F_6/K_6)^2$. This signal, as shown in the drawing, is also transmitted to ratio computer 98. As indicated in the drawing, computer 98 generates a signal that is a function of the ratio of the two input signals $(F_4/K_4)^2$ and $(F_6/K_6)^2$. The output signal of computer 98 is transmitted to a flow controller FRC-9 wherein it is converted into a corresponding pneumatic pressure to regulate valve 100. Thus valve 100 is automatically regulated to maintain substantially constant the ratio of flow through pipe 32 (before addition of make-up gas)

to the flow through pipe 64. It will be evident to those skilled in the art that the various signals referred to above can be transmitted by either pneumatic or electrical means.

The particular gas flows used in the various parts of the system described above will vary depending upon such factors as the nature and particle size of the ore, the residence time of the ore in the reactor, the degree of reduction desired, and the amount of carbon that it is desired to deposit on the reduced ore. Approximate illustrative values of the flows in the different parts of the system are given in the following Table:

|  | Gas Flow Units |
|---|---|
| Gas entering reactor at plenum 20 | 200 |
| Upward flow in reduction zone 12 | 150 |
| Downward flow in reduction zone 12 | 50 |
| Gas entering reactor at chamber 26 | 100 |
| Gas flow in pipe 54 | 150 |
| Gas flow in pipe 60 | 300 |
| Gas flow in pipe 62 | 150 |
| Gas flow in pipe 64 | 150 |
| Gas flow in pipe 32 before make-up | 100 |
| Gas flow in pipe 70 before make-up | 50 |
| Gas flow in pipe 30 | 100 |
| Gas flow in pipe 31 | 50 |
| Gas flow in pipe 28 | 150 |

The flows given in the foregoing Table are only approximate since they do not take into account, for example, changes due to air or oxygen injection into combustion chamber 38, changes due to the gas-solid reaction in the reactor and changes due to water removal in quench tower 58. The flow values of the Table are intended to give merely a rough idea of typical flows in the different portions of the system.

From the foregoing description it should be apparent that the present invention provides a method of reducing and cooling metal ores capable of achieving the objects set forth at the beginning of the present specification. By using a split flow of the reducing gas in the reduction zone of the reactor advantageous features of counter-current and co-current flow of the gas and ore are obtained while minimizing the disadvantageous features of these two types of flow. Both the split reducing gas streams and the cooling gas streams are recycled and recycling of all three of these streams is effected with a single pump, cooler and combustion chamber. Thus the present invention provides an exceptionally efficient method of producing sponge iron having a desired carbon content in a vertical shaft, moving bed reactor.

A further advantage of the present system arises out of the fact that the plenum chamber 20 near the center of the reduction zone is an inlet plenum chamber. In the design and operation of commercial plants especially where the ore being treated contains a substantial portion of small particles, the transport of particles out of the reactor caused by high gas velocities at an outlet plenum can present a problem. In the system here described the plenum chamber 20 which handles a relatively high gas flow is an inlet plenum, thus eliminating the problem of transport of particles out of this portion of the reactor. While it is true that a relatively large volume of gas leaves the reactor through plenum chamber 22, this gas is at a relatively low temperature which renders the transport problem less acute.

It is, of course, to be understood that the foregoing description is intended to be illustrative only and that numerous changes can be made therein without departing from the spirit of the invention as defined in the appended claims.

We claim:

1. The method of reducing a particulate metal ore to metal particles in a vertical shaft, moving bed reactor having a reduction zone in the upper portion thereof in which a hot reducing gas is caused to flow through a portion of said bed to reduce the metal ore thereof to metal and a cooling zone in the lower portion of said bed for cooling the reduced metal particles which comprises feeding a first stream of hot reducing gas to said reactor near the center of said reduction zone and causing separate portions of said stream to flow upwardly and downwardly through said bed, removing substantially all of the upwardly flowing portion of said first stream from said reactor near the top of said reduction zone as a second gas stream, feeding a third stream of cold reducing gas to said reactor near the bottom of said cooling zone and causing it to flow upwardly through the bed in said cooling zone, combining the upwardly flowing gas in said cooling zone and the downwardly flowing gas in said reduction zone to form a fourth gas stream and removing said fourth stream from said reactor, mixing said second and fourth gas streams externally of said reactor to form a fifth gas stream, recycling a portion of said fifth stream to said reactor as said first stream and recycling the remainder of said fifth stream to said reactor as said third stream.

2. A method according to claim 1 wherein preformed make-up reducing gas composed largely of carbon monoxide and hydrogen is added to said first stream before it is heated.

3. A method according to claim 1 wherein preformed make-up reducing gas composed largely of carbon monoxide and hydrogen is added to said third stream.

4. A method according to claim 1 wherein depleted reducing gas is vented from said fifth stream.

5. A method according to claim 1 wherein said first stream is heated before being fed to said reactor.

6. A method according to claim 1 wherein said fifth stream is cooled and compressed before being recycled to said reactor.

7. A method according to claim 4 wherein the flow of said fifth gas stream is measured before and after venting of depleted reducing gas therefrom, the ratio of said flow measurements is determined and the recycled flow of said fifth stream is regulated in response to the ratio of said two measurements.

8. A method according to claim 2 wherein the flow of said fifth stream is measured, the flow of the portion of said fifth stream recycled as said first stream is measured, the ratio of said two flow measurements is determined and the portion of said fifth stream recycled as said first stream is regulated to maintain said ratio substantially constant.

9. The method of reducing a particulate metal ore to metal particles in a vertical shaft, moving bed reactor having a reduction zone in the upper portion thereof in which a hot reducing gas is caused to flow through a portion of said bed to reduce the metal ore thereof to metal and a cooling zone in the lower portion of said bed for cooling the reduced metal particles which comprises feeding a first stream of hot reducing gas to said reactor near the center of said reduction zone and causing separate portions of said stream to flow upwardly and downwardly through said bed, removing substantially all of the upwardly flowing portion of said first stream from said reactor near the top of said reducing zone as a second gas stream, feeding a third stream of cold reducing gas to said reactor near the bottom of said cooling zone and causing it to flow upwardly through the bed in said cooling zone, combining the upwardly flowing gas in said cooling zone and the downwardly flowing gas in said reduction zone to form a fourth gas stream and removing said fourth stream from said reactor, mixing said second and fourth gas streams externally of said reactor to form a fifth gas stream, recycling a portion of said fifth stream to said reactor as said first stream, recycling the remainder of said fifth stream to said reactor as said third stream, venting depleted reducing gas from said fifth stream, adding make-up gas to said first stream before it is heated and adding make-up gas to said third stream.

10. A method according to claim 9 wherein the flows of said first, second and third streams are maintained substantially constant, the flow of said fifth stream is measured before and after venting of depleted gas therefrom, the ratio of said measured flows is determined and the recycled portion of the fifth stream is regulated in response to said ratio.

11. A method according to claim 9 wherein the flows of said first, second and third streams are maintained substantially constant, the flow of said fifth stream after venting depleted reducing gas therefrom is measured, the flow of the portion of said fifth stream recycled as said first stream is measured, the ratio of said measured flows is determined and the portion of said fifth stream recycled as said first stream is regulated in response to said ratio.

12. Apparatus for reducing a particulate metal ore to metal particles in a vertical shaft, moving bed reactor having a reduction zone in which a hot reducing gas is caused to flow through a portion of said bed to reduce the metal ore thereof to metal and a cooling zone in which the reduced metal ore is cooled comprising, in combination with said reactor, a first conduit connected to said reactor near the middle of said reduction zone for supplying heated reducing gas to said zone, a second conduit connected to said reactor near the top of said reduction zone, a third conduit connected to said reactor near the bottom of said cooling zone for supplying gas to said cooling zone, a fourth conduit connected at one end to said reactor near the bottom of said reduction zone and at its other end to the end of said second conduit remote from said reactor, a fifth conduit connected at one end to the junction of said second and fourth conduits and at its other end to said first and third conduits, said first, second and fifth conduits and the upper portion of said reduction zone forming a first gas flow loop, said first, fourth and fifth conduits and the lower portion of said reduction zone forming a second gas loop and said third, fourth and fifth conduits and said cooling zone forming a third gas flow loop, valve means in said loops for regulating the gas flow therethrough, a source of make-up gas, conduit means for connecting said source of make-up gas to said first and third conduits and venting means connected to said fifth conduit for venting a portion of the gas flowing through said loops.

13. Apparatus according to claim 12 wherein said first conduit includes heating means for heating the gas flowing therethrough to said reactor.

14. Apparatus according to claim 12 wherein said fifth conduit includes cooling means for cooling the gas flowing therethrough.

15. Apparatus according to claim 12 wherein said fifth conduit includes pumping means for pumping the gas through said loops.

16. Apparatus according to claim 12 wherein said fifth conduit includes first measuring means for measuring the gas flow therethrough ahead of said venting means and second measuring means for measuring the gas flowing through said fifth conduit after said venting means, and regulating means in said fifth conduit for regulating gas flow in response to the ratio of flow values measured by said first and second measuring means.

17. Apparatus according to claim 12 including first measuring means for measuring gas flow in said fifth conduit, second measuring means for measuring gas flow in said first conduit and regulating means in said first conduit for regulating gas flow therein in response to the ratio of gas flow measured by said first and second flow measuring means.

* * * * *